US012665285B2

(12) United States Patent
Azzinnari et al.

(10) Patent No.: US 12,665,285 B2
(45) Date of Patent: Jun. 23, 2026

(54) TRANSMISSION COUPLER

(71) Applicant: Kamstrup A/S, Skanderborg (DK)

(72) Inventors: Leonardo Azzinnari, Skanderborg (DK); Bo Rosenberg Pedersen, Skanderborg (DK); Klaus Lund Nielsen, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 142 days.

(21) Appl. No.: 18/544,691

(22) Filed: Dec. 19, 2023

(65) Prior Publication Data

US 2024/0213653 A1 Jun. 27, 2024

(30) Foreign Application Priority Data

Dec. 27, 2022 (EP) ..................................... 22216731

(51) Int. Cl.
*H01Q 1/22* (2006.01)
*G01D 4/00* (2006.01)
*H01Q 1/50* (2006.01)

(52) U.S. Cl.
CPC .............. *H01Q 1/22* (2013.01); *G01D 4/002* (2013.01); *H01Q 1/50* (2013.01)

(58) Field of Classification Search
CPC ............. H01Q 1/22; H01Q 1/50; G01D 4/002
See application file for complete search history.

(56) References Cited

U.S. PATENT DOCUMENTS

| | | | |
|---|---|---|---|
| 8,610,594 B1 * | 12/2013 | Salser, Jr. ............ | H01Q 1/2233 340/870.02 |
| 10,276,917 B2 * | 4/2019 | Christiansen ........ | H01Q 1/1214 |
| 11,119,133 B2 * | 9/2021 | Bonicatto ............ | H01Q 1/2233 |
| 2008/0074283 A1 * | 3/2008 | Verkleeren ........... | H01Q 1/2233 340/870.02 |

(Continued)

OTHER PUBLICATIONS

European Search Report dated Jun. 19, 2023, for EP 22216731.

*Primary Examiner* — Hai V Tran
(74) *Attorney, Agent, or Firm* — Renner, Otto, Boisselle & Sklar, LLP

(57) ABSTRACT

The present disclosure refers to a transmission coupler for receiving radio signals carrying consumption data from a utility meter. The utility meter comprises a meter housing wherein a radio frequency transmitter circuit and a meter antenna is arranged. The transmission coupler comprises a coupling antenna, a transmission line or a radio frequency connector for connection of a transmission line and a mechanical connection element. The mechanical connection element is arranged for mechanically connection of the transmission coupler to an outer surface of the meter housing whereby a near field coupling is provided between the meter antenna and the coupling antenna through the meter housing. The transmission line or radio frequency connector is electrically connected to the coupling antenna. The transmission coupler further comprises a displacement element arranged to occupy a volume in the proximity of the coupling antenna, whereby a volume of a medium surrounding the transmission coupler is displaced away from the cou- (Continued)

pling antenna by the displacement element, such that the influence on the near field coupling by the medium surrounding the coupling antenna is reduced.

15 Claims, 4 Drawing Sheets

(56)                    References Cited

U.S. PATENT DOCUMENTS

2008/0150750 A1 *    6/2008   Parris .................... G01D 11/245
                                                              73/201
2010/0253538 A1 *   10/2010   Smith .................... G01D 4/002
                                                              29/601
2013/0057367 A1 *    3/2013   Smith ........................ H01P 5/02
                                                              333/24 C

* cited by examiner

TRANSMISSION COUPLER

This application is a Secondary and claims priority of European Patent Application No. 22216731.4, filed Dec. 27, 2022, which is hereby incorporated herein by reference in its entirety.

FIELD OF THE INVENTION

The present invention relates to the technical field of transmission couplers for receiving radio signals from utility meters, especially to the field of non-galvanic transmission couplers and consumption data transmission systems.

BACKGROUND OF THE INVENTION

Utility meters often have built in or integrated radio communication circuits including radio receivers and transmitters, the two together called a transceiver. An antenna is connected to the transceiver to facilitate and improve transmission and reception of radio signals. The antenna may be an integrated antenna arranged inside a utility meter housing or an external antenna arranged outside the utility meter housing. The external antenna is normally galvanically (electrically) connected to the transceiver inside the utility meter housing via a radio frequency connector or radio transmission line through the utility meter housing. Especially, in relation to utility meters for being mounted in a humid environment, galvanic radio frequency connectors are undesired due to the risk of water entering the utility meter housing via the radio frequency connector. However, radio frequency connectors have the advantage that an external antenna may be galvanically connected via a cable to the transceiver inside the utility meter housing. This has the advantage of efficient transfer of radio signals from the transceiver to the external antenna or a remote antenna, which may be placed in a location different from the installation point of the utility meter. This is especially advantageous for water meters installed in meter pits, where radio communication conditions may be bad. Water meters installed in meter pits are often hermetically closed to avoid intrusion of water into the meter housing in case the pit is flooded. Often the water meters are self-supplied by an integrated battery so that no galvanic connection through the meter housing is required, consequently a galvanic radio frequency connector for connecting a remote antenna is undesired.

To improve radio communication between the utility meter and a meter reading system, a non-galvanic transmission coupler is attached to the meter housing and arranged to couple to the internal antenna of the utility meter. The coupler is then electrically connected to a remote antenna via a transmission line. The remote antenna may be mounted in a position where radio communication conditions are better than at the utility meter installation point. Typically, the remote antenna is mounted in a pit lid or on top of a pit lid.

The transmission coupler attached to the meter is tuned to provide a near field coupling with the internal antenna in the utility meter. The near field coupling preferably has a minimal coupling loss to ensure efficient radio communication between the utility meter and the meter reading system.

Due to the installation of the utility meter in a pit the meter is often flooded by water or covered by dirt. This has the consequence that the transmission coupler in some time periods is surrounded by water, sand, mud or dirt instead of air. The resonance/impedance of the coupler is modified by the changing medium around the coupler whereby the efficiency of the near field coupling between the transmission coupler and the internal antenna is impaired and the efficiency of the radio communication is impaired.

OBJECT OF THE INVENTION

It is an object of the present invention to provide a transmission coupler, which has a high and constant efficiency. In particular, it may be seen as an object of the present invention to provide a reliable and highly efficient consumption data transmission system for transmission of radio signals from a utility meter installed in surroundings with poor radio communication conditions.

SUMMARY OF THE INVENTION

Thus, the above-described object and several other objects are intended to be obtained in a first aspect of the invention by providing a transmission coupler for receiving radio signals carrying consumption data from a utility meter, said utility meter comprising a meter housing wherein a radio frequency transmitter circuit and a meter antenna is arranged. The transmission coupler comprises a coupling antenna; a transmission line or a radio frequency connector for connection of a transmission line; and a mechanical connection element. The mechanical connection element is arranged for mechanically connection of the transmission coupler to an outer surface of the meter housing whereby a near field coupling is provided between the meter antenna and the coupling antenna through the meter housing. The transmission line or radio frequency connector is electrically connected to the coupling antenna. The transmission coupler further comprises a displacement element arranged to occupy a volume in the proximity of the coupling antenna, whereby a volume of a medium surrounding the transmission coupler is displaced away from the coupling antenna by the displacement element, such that the influence on the near field coupling by the medium surrounding the coupling antenna is reduced.

The transmission coupler is advantageous because it provides an efficient and stable non-galvanic transfer of radio signals between the meter antenna and the transmission line/radio frequency connector. Especially, no galvanic connection, i.e. electrical connection, to the electronics inside the utility meter is required. A galvanic connection between the electronic circuits internally in the meter housing, such as radio transmitter/receiver/transceiver is undesired because it comes with a potential risk of the galvanic connection creating a channel for water intruding into the meter housing.

The displacement element has the technical effect of reducing or diminishing the influence of the medium surrounding the coupling antenna on the tuning/resonance frequency of the coupling antenna. The detuning of the coupling antenna will have a negative influence on the efficiency of the near field coupling between the meter antenna and the coupling antenna. Thus, the displacement element has the effect of ensuring a stable near field coupling with only little or no variation in coupling efficiency despite the electromagnetic properties of the medium surrounding the transmission coupler vary. The displacement element and the meter housing, at which the coupling antenna is arranged together, provides a stable and electromagnetically non dynamic zone within the near field, especially the reactive near field, of the coupling antenna whereby the stability of the near field coupling is increased.

In simpler terms, the transmission coupler comprises a displacement element arranged to occupy a volume in the proximity of the coupling antenna, such that the influence on the near field coupling by the medium surrounding the transmission coupler is reduced.

Especially, the electromagnetic properties of the medium surrounding the transmission coupler has an influence on the coupling antenna, such as an influence on the resonance frequency or impedance of the coupling antenna. The electromagnetic properties of air, water, dry dirt, humid dirt etc. differ significantly. In other words, the transmission coupler comprises a displacement element arranged to occupy a volume in the proximity of the coupling antenna, such that the influence on the near field coupling by the electromagnetic properties of the medium surrounding the transmission coupler is reduced.

Thus, the transmission coupler comprises a displacement element arranged to occupy a volume in the proximity of the coupling antenna, such that variations in the medium surrounding the transmission coupler has a reduced influence on the near field coupling.

The displacement element being arranged to occupy a volume in the proximity of the coupling antenna has the logical consequence that the displacement element is arranged in the proximity of the coupling antenna.

The displacement element arranged in the proximity of the coupling antenna has the effect of creating a stable electromagnetic environment in the proximity of the coupling antenna. In other words the transmission coupler comprises a displacement element arranged to occupy a volume in the proximity of the coupling antenna, whereby a volume of a medium surrounding the transmission coupler is displaced away from the coupling antenna by the displacement element and the electromagnetic properties of the occupied volume primarily depend on the material of the displacement element and the influence on the near field coupling by the medium surrounding the transmission coupler is reduced. Or with a simpler phrasing, the transmission coupler comprises a displacement element arranged to occupy a volume in the proximity of the coupling antenna, whereby the electromagnetic properties of the occupied volume primarily depend on the material of the displacement element and the influence on the near field coupling by variations in the medium surrounding the transmission coupler is reduced.

The displacement element is arranged to occupy a volume in the proximity of the coupling antenna, whereby the medium surrounding the transmission coupler is prevented from filling the volume occupied by the displacement element.

In alternative wording the displacement element is arranged to occupy a space in the proximity of the coupling antenna, whereby a medium surrounding the transmission coupler is prevented from filling said space, such that the influence on the near field coupling by the medium surrounding the coupling antenna is reduced.

It is known to the person skilled in the art that a transmission coupler for receiving radio signals carrying consumption data from a utility meter will also be able to transmit radio signals to the utility meter. Thus, it is to be understood that the transmission coupler Is suitable for two-way communication. By consumption data is understood any data originating from the consumption meter such as an amount of consumed utility, alarms, tamper detection, voltage, current, power and data related to the consumption system such as pressure, acoustic leak detection information etc. The utility meter may be any utility meter such as a water meter, gas meter, electricity meter, heat energy meter or heat cost allocator.

The utility meter may be a water meter comprising a flow channel and a meter housing wherein a radio frequency transmitter circuit and optionally a receiver circuit or a transceiver is arranged. Further the meter antenna is arranged inside the meter housing. It is understood that the antenna may comprise one or more radiating elements. The meter antenna may be a monopole, a dipole, a loop antenna or an inverted-F antenna or any other kind of suitable antenna. The meter antenna may be an electromagnetically short antenna, i.e. the antenna is shorter than half a wavelength due to space constraints within the meter housing. The meter antenna preferably has a resonance frequency in a frequency band of operation.

The coupling antenna may be a mono pole, a dipole, a loop antenna or an inverted-F antenna or any other suitable antenna. The coupling antenna is electrically i.e., galvanically, connected to the transmission line or the radio frequency connector so that the coupling antenna may be connected to a remote antenna. The coupling antenna may be an electromagnetically short antenna i.e., the antenna is shorter than half a wavelength. The coupling antenna preferably has a resonance frequency in a frequency band of operation.

The mechanical connection element for mechanically connection of the transmission coupler to an outer surface of the meter housing may an integrated part of the displacement element such that the mechanical connection element and the displacement element form a single monolithic unit or alternatively the mechanical connection element and the displacement element may be two separable elements which are either mechanically connected to each other via connection means such as a click locking mechanism or alternatively they are individually arranged for being mechanically connected to the meter housing. The mechanical connection element may be arranged for mechanical connection to a meter housing by use of protrusion or indentations forming a click locking or snapping mechanism alternatively the mechanical connection element may comprise a threaded part for mechanical connection to a meter housing. In yet another alternative the mechanical locking element is arranged for being glued, ultrasonic welded or strapped to a meter housing. The displacement element may be mechanically connected to the mechanical connection element. The mechanical connection element and the displacement element being two separate elements has the advantage of easing installation due to a smaller size and only installing the displacement element in environments where it is required.

The coupling between the meter antenna and the coupling antenna is a near field coupling due to the fact the two respective antennas are arranged in the near field of the other antenna to provide a near field coupling through the meter housing. Especially the two respective antennas may be arranged in the reactive near field of the other antenna and couple in the reactive near field through the meter housing.

Optionally in the transmission coupler according to the first aspect the coupling antenna is tuned to have a resonance at a predetermined frequency and the influence on the resonance of the coupling antenna by the medium surrounding the transmission coupler is reduced by the displacement element. The predetermined frequency may be a frequency close to an operating frequency of the meter or at least a frequency in the frequency band of the operating frequency. This has the advantage of increasing efficiency of the near field coupling. Preferably the predetermined frequency is less than 1 GHz Especially, for transmission couplers for wireless M-Bus, LoRa, Sigfox and proprietary communication systems the predetermined frequency is preferably in the range from 863 MHz to 928 MHz. For transmission couplers for NB-IOT/LTE communication systems the predetermined frequency may be in one or more of the bands 698-960 MHz, 1710-2170 MHz or 2.3-2.4 GHz or any other band used for LTE cat. NB or cat. M1/M2. The coupling antenna may be a dual band or multi band antenna with two or more resonances at predetermined frequencies.

Optionally in the transmission coupler according to the first aspect, the coupling antenna has a maximum length or maximum dimension which is shorter than half the wavelength of a radio signal at the determined frequency in free space. Antennas in utility meters are often restricted by the space available in the meter housing, thus the coupler antenna arranged at an outer surface of the meter housing will meet the same constraints and be an electromagnetically short antenna. An electromagnetically short antenna is understood to be an antenna with a length equal to, or shorter than, one-half wavelength of radiation emitted by the antenna at the predetermined frequency. Thus, the coupling antenna of the transmission coupler may be an electromagnetically short antenna. Optionally, for a dual or multi band antenna the maximum length or maximum dimension may be shorter than half the wavelength of a radio signal at one or more of the determined frequencies in free space.

Preferably, the displacement element is arranged in the reactive near field of the coupling antenna where the reactive near field is within a distance D of the coupling antenna calculated as $D=\lambda/2\pi$, where $\lambda$ is the wavelength of a radio signal at the predetermined frequency in free space. The displacement element may extend beyond the reactive near field of the coupling antenna. The reactive near field is defined as a zone or a space being within a distance D of the antenna where $D=\lambda/2\pi$. Especially the electromagnetic properties of the medium in the reactive near field has turned out to be determining to the efficiency of the near field coupling, it is thus advantageous to arrange the displacement element in the reactive near field of the coupling antenna. Especially for electromagnetically short antennas the distance D of the reactive near field is defined as $D=\lambda/2\pi$, where $\lambda$ is the wavelength of a radio signal at the determined frequency.

In other words, displacement element may be arranged to occupy a volume in the near field or reactive near field of the coupling antenna, whereby a volume of a medium surrounding the transmission coupler is displaced away from the coupling antenna by the displacement element, such that the influence on the near field coupling by the medium surrounding the coupling antenna is reduced.

Or with a simpler wording, the transmission coupler comprises a displacement element arranged to occupy a volume in the reactive near field of the coupling antenna, whereby the electromagnetic properties of the occupied volume primarily depend on the material of the displacement element and the influence on the near field coupling by variations in the medium surrounding the transmission coupler is reduced.

In an even more simple wording, the transmission coupler comprises a displacement element arranged to occupy a volume in the reactive near field of the coupling antenna, such that the influence on the near field coupling by the medium surrounding the transmission coupler is reduced.

The displacement element is preferably suitable for being arranged at an outer surface of the meter housing and may optionally also be arranged in the near field, especially the reactive near field of the meter antenna.

Thus, the displacement element may in all abovementioned variants be said to be arranged in the proximal near field of the coupling antenna or in the proximal part of the reactive near field of the coupling antenna, where proximal is to be understood in relation to the coupling antenna, i.e., the part of the (reactive) near field closest to the coupling antenna.

Preferably the displacement element is made from a nonconductive material such as polycarbonate or a polycarbonate shell which may be air filled or filled with polystyrene or polyurethane or epoxy all of which may be foamed.

Optionally, the coupling antenna has a first surface arranged for facing a surface of the meter housing and a second surface arranged for facing away from the meter housing and the displacement element is arranged to occupy a volume in the proximity of the second surface. The coupling antenna is thereby arranged in between the meter housing and the displacement element, whereby the near field, especially the reactive near field, is on the first side of the coupling antenna at least partly occupied by the meter housing and on the second side of the coupling antenna at least partly occupied by the displacement element. This has the advantage that a large part of the reactive near field is occupied by static elements and the influence on the coupling antenna and the efficiency of the near field coupling by the medium surrounding the transmission coupler is reduced.

Preferably, the displacement element extends at least 5 mm in a direction perpendicular to the second surface and/or at least 5 mm in a direction parallel to the second surface. More preferably, the displacement element extends at least 10 mm in a direction perpendicular to the second surface and/or at least 10 mm in a direction parallel to the second surface. Alternatively, the displacement element extends a distance equal to or greater than a/4n in a direction perpendicular to the second surface.

Optionally the displacement element extends along a length of the coupling antenna and occupies a volume of at least 100 mm$^3$ per mm of extension along the length of the coupling antenna. The displacement element may extend along a part of the length of the coupling antenna or along the entire length of the coupling antenna. Optionally the displacement element is arranged to extend along a length of the outer surface of the meter housing and to occupy a volume of at least 100 mm$^3$ per mm of extension along the length of the outer surface of the meter housing. Preferably, the volume occupied is within the reactive near field of the meter antenna.

Optionally the displacement element extends at least 5 mm in a direction perpendicular to the second surface and extends at least 80% of the coupling antenna's length in a direction parallel to the second surface. Alternatively, the displacement element extends at least 5 mm in a direction perpendicular to the second surface and extends at length equal to or larger than a/4n of the coupling antennas length in a direction parallel to the second surface.

Optionally the displacement element is arranged to fit around a circumference of a meter housing and has a center opening for allowing free access to a display of the utility meter.

In a second aspect of the invention is provided a consumption data transmission system comprising a utility meter; a transmission coupler for receiving radio signals carrying consumption data from the utility meter; and a remote antenna. The utility meter comprises: a meter housing wherein a meter antenna and a radio frequency transmitter circuit is arranged. The transmission coupler comprises: a mechanical connection element; a coupling antenna arranged at an outer surface of the meter housing; and a transmission line. The transmission coupler is mechanically connected to the meter housing via the mechanical connection element such that the coupling antenna and the meter antenna are arranged for near field coupling between the respective two antennas through the meter housing and the transmission line is arranged to electrically connect the coupling antenna to the remote antenna. The consumption data transmission system further comprises a displacement element arranged to occupy a volume in the proximity of the coupling antenna and/or meter antenna whereby a volume of a medium surrounding the transmission coupler is displaced away from the coupling antenna and/or the meter antenna by the displacement element, such that the influence on the near field coupling between the meter antenna and the coupling antenna by the medium surrounding the transmission coupler is reduced.

The consumption data transmission system of the second aspect of the invention is understood to have the same advantages as the transmission coupler according to the first aspect of the invention. Further, one or more of the optional elements and preferred features of the first aspect of the invention also applies to the second aspect of the invention and may be combined with the second aspect of the invention especially in relation to the transmission coupler.

Further, the consumption data system is especially advantageous for transmission of data from utility meter installed at an installation point with poor radio communication conditions, in that the transmission coupler collects the radio signals transmitted form the utility meter and lead them to the remote antenna via the transmission line, the remote antenna may then be installed at an installation point with good radio communication conditions. The consumption data transmission system is especially advantageous for installation of a utility meter, such as a water meter in a metering pit. Radio communication conditions are often very bad in radio pits and the pits are often flooded. Installing the remote antenna in the pit lit together with the displacement element of the transmission coupler ensures a robust meter reading system with a meter reading performance that does not deteriorate or only deteriorates slightly in case the meter pit is flooded. The near field coupling between the meter antenna and the coupling antenna is very efficient and only to a minor degree influenced by the medium surrounding the transmission coupler.

The transmission coupler of the consumption data transmission system may be any of the abovementioned variants of the transmission coupler according to the first aspect of the invention.

Preferably the consumption data transmission system according to the second aspect, is arranged such that the meter antenna and the coupling antenna each are tuned to have a resonance at a predetermined frequency and the influence on the resonance of the coupling antenna and/or the meter antenna by the medium surrounding the transmission coupler is reduced by the displacement element. Optionally, the meter antenna and the coupler antenna are tuned to have a resonance frequency at essentially the same predetermined frequency or at two predetermined frequencies not separated by more than 10 MHz. More preferably, the meter antenna and the coupler antenna are tuned such that the predetermined frequency of the coupler antenna deviates less than 5% from the predetermined frequency of the meter antenna. The meter antenna and/or the coupling antenna may be a dual band or multi band antennas with two or more resonances at predetermined frequencies. Preferably the consumption data transmission system according to the second aspect is arranged such that the predetermined frequency is less than 1 GHz, or preferably in the range from 863 MHz to 928 MHz.

Optionally the consumption data transmission system is arranged such that the coupling antenna and/or the meter antenna have/has a maximum length or maximum dimension which is shorter than half the wavelength of a radio signal at the predetermined frequency in free space. Electromagnetically short antennas are advantageous due to the limited physical dimensions of utility meters, especially water meters. Optionally for a dual or multi band antenna the maximum length or maximum dimension may be shorter than half the wavelength of a radio signal at one or more of the determined frequencies in free space.

Preferably the consumption data transmission system is arranged such that the displacement element is arranged in the reactive near field of the coupling antenna and/or the meter antenna and the reactive near field is defined as being within a distance D from the coupling antenna and/or meter antenna calculated as $D=\lambda/2\pi$, where $\lambda$ is the wavelength of a radio signal at the predetermined frequency in free space. It is especially advantageous if the displacement element is arranged in the reactive near field of the coupling antenna and/or the meter antenna. In the case where the meter antenna and the coupling antenna both have the displacement element arranged within the reactive near field the stabilizing effect of the displacement element is increased even more, and the near field coupling is even less influenced by changes in a medium surrounding the transmission coupler.

It is preferable to arrange the consumption data transmission system according to the second aspect such that a distance between meter antenna and coupling antenna (through a wall of the meter housing) is less than 10 mm. This has the advantage that the near field coupling becomes very efficient. It is especially advantageous to have the meter antenna, meter housing, coupling antenna and the displacement element form a layered structure in the mentioned sequence.

Optionally, the consumption data transmission system according to the second aspect of the invention is arranged such that the coupling antenna is arranged in the reactive near field of the meter antenna and the reactive near field is defined as being within a distance D from the meter antenna calculated as $D=\lambda/2\pi$, where $\lambda$ is the wavelength of a radio signal at the predetermined frequency in free space.

Antennas in utility meters are often restricted by the space available in the meter housing, thus the coupler antenna arranged at an outer surface of the meter housing may meet the same constraints and be an electromagnetically short antenna. In this context an electromagnetically short antenna is understood to be an antenna with a length equal to, or shorter than, one-half wavelength of radiation emitted by the antenna at the predetermined frequency. The reactive near field is defined as a zone or space within a distance D from the antenna, where $D=\lambda/2\pi$. Especially the electromagnetic properties of the medium in the reactive near field has turned out to be determining to the efficiency of the near field coupling, it is thus advantageous to arrange the displacement element in the reactive near field. Especially for electromagnetically short antennas the reactive near field is defined as $\lambda/2\pi$, where $\lambda$ is the wavelength of a radio signal at the predetermined frequency.

Preferably, the displacement element of the consumption data transmission system is made from a nonconductive material, such as one of the materials mentioned above in relation to the first aspect of the invention.

Optionally, the consumption data transmission system according to the second aspect of the invention is arranged such that the coupling antenna has a first surface arranged for facing a surface of the meter housing and a second surface arranged for facing away from the meter housing and the displacement element is arranged to occupy a volume in the proximity of the second surface.

Optionally, the displacement element extends at least 5 mm in a direction perpendicular to the second surface and/or at least 5 mm in a direction parallel to the second surface.

Optionally, the displacement element extends at least 5 mm in a direction perpendicular to the second surface and at least 80% of the coupling antenna's length in a direction parallel to the second surface.

Optionally, the displacement element extends along a length of the coupling antenna and occupies a volume of at least 100 mm3 per mm of extension along the length of the coupling antenna.

Optionally, the consumption data transmission system is arranged such that the displacement element extends along a length of the outer surface of the meter housing and occupies a volume of at least 100 mm3 per mm of extension along the length of the outer surface of the meter housing. Preferably, the volume occupied is within the reactive near field of the meter antenna.

Optionally, the consumption data transmission system is arranged such that the displacement element is mechanically connected to the mechanical connection element or the meter housing.

Optionally, the displacement element of the consumption data transmission system is arranged to fit around a circumference of the meter housing and has a center opening for allowing free access to a display of the utility meter.

Optionally, the consumption data transmission system according to the second aspect of the invention is arranged such that the coupling antenna is arranged between the meter housing and the displacement element.

In a third aspect of the invention is provided a displacement element for at a consumption data transmission system comprising a utility meter with a meter housing; a meter antenna and a radio frequency transmitter circuit arranged inside the meter housing for transmitting consumption data and a coupling antenna arranged at an outer surface of the meter housing and mechanically coupled to the meter housing such that the coupling antenna and the meter antenna are arranged for near field coupling between the respective two antennas through the meter housing. Said displacement element being arranged to occupy a volume in the proximity of the coupling antenna and/or meter antenna whereby a volume of a medium surrounding the coupling antenna and/or the meter antenna is displaced away from the coupling antenna and/or the meter antenna by the displacement element, such that the influence on the near field coupling between the meter antenna and the coupling antenna by the medium surrounding the coupling antenna and/or meter antenna is reduced.

The displacement element according to the third aspect of the invention may have one or more of the optional elements or preferred features of the displacement element according to the first aspect. Further, the displacement element according to the third aspect of the invention has the same or similar advantages as described for the displacement element for the first aspect of the invention.

The individual aspects of the present invention may each be combined with any of the other aspects. These and other aspects of the invention will be apparent from the following description with reference to the described embodiments.

BRIEF DESCRIPTION OF THE FIGURES

The transmission coupler and consumption data transmission system according to the invention will now be described in more detail with regards to the accompanying figures. The figures show one way of implementing the present invention and is not to be construed as being limiting to other possible embodiments falling within the scope of the attached claim set.

DETAILED DESCRIPTION OF AN EMBODIMENT

Figures 1A, 1B:
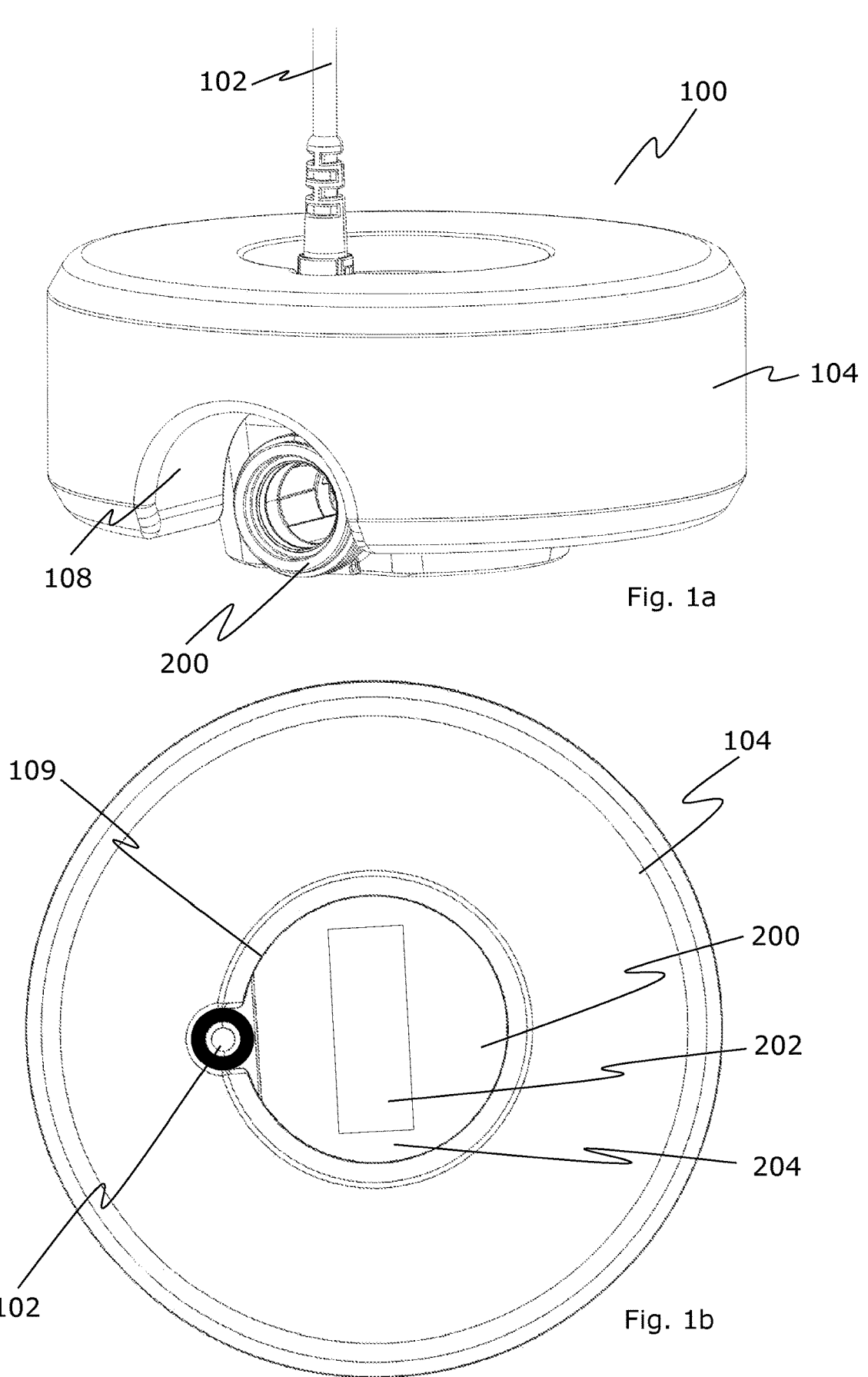
FIG. 1*a* shows an example of a transmission coupler mounted on a water meter, seen form the side.
FIG. 1*b* shows the example of a transmission coupler mounted on a water meter seen from the top.

A first a first embodiment of a transmission coupler 100 is disclosed in FIG. 1*a* and FIG. 1*b*. The transmission coupler in FIG. 1*a* is mounted on a utility meter 200 which is this case is a water meter. The transmission coupler is mounted on the water meter from the top of the meter. The transmission coupler 100 comprises a coupling antenna 101 (not visible on FIG. 1*a*), a transmission line 102, a mechanical connection element 103 (not visible on FIG. 1*a*) and a displacement element 104. The displacement element covers the top part of the utility meter 200 as well as the coupling antenna 101, thus the displacement element 104 is arranged in the reactive near field of the coupling antenna 101. Further, as it is seen on FIG. 1*a* the displacement element extends along a circumference of the utility meter whereby the displacement element is also arranged inside the reactive near field of the meter antenna 205 which is arranged inside the meter housing 201. Due to the displacement element arranged in the near field, i.e. the reactive near field of the coupling antenna and the meter antenna 205, the medium surrounding the transmission coupler has a reduced influence on the near field coupling between the two respective antennas.

Figure 2:
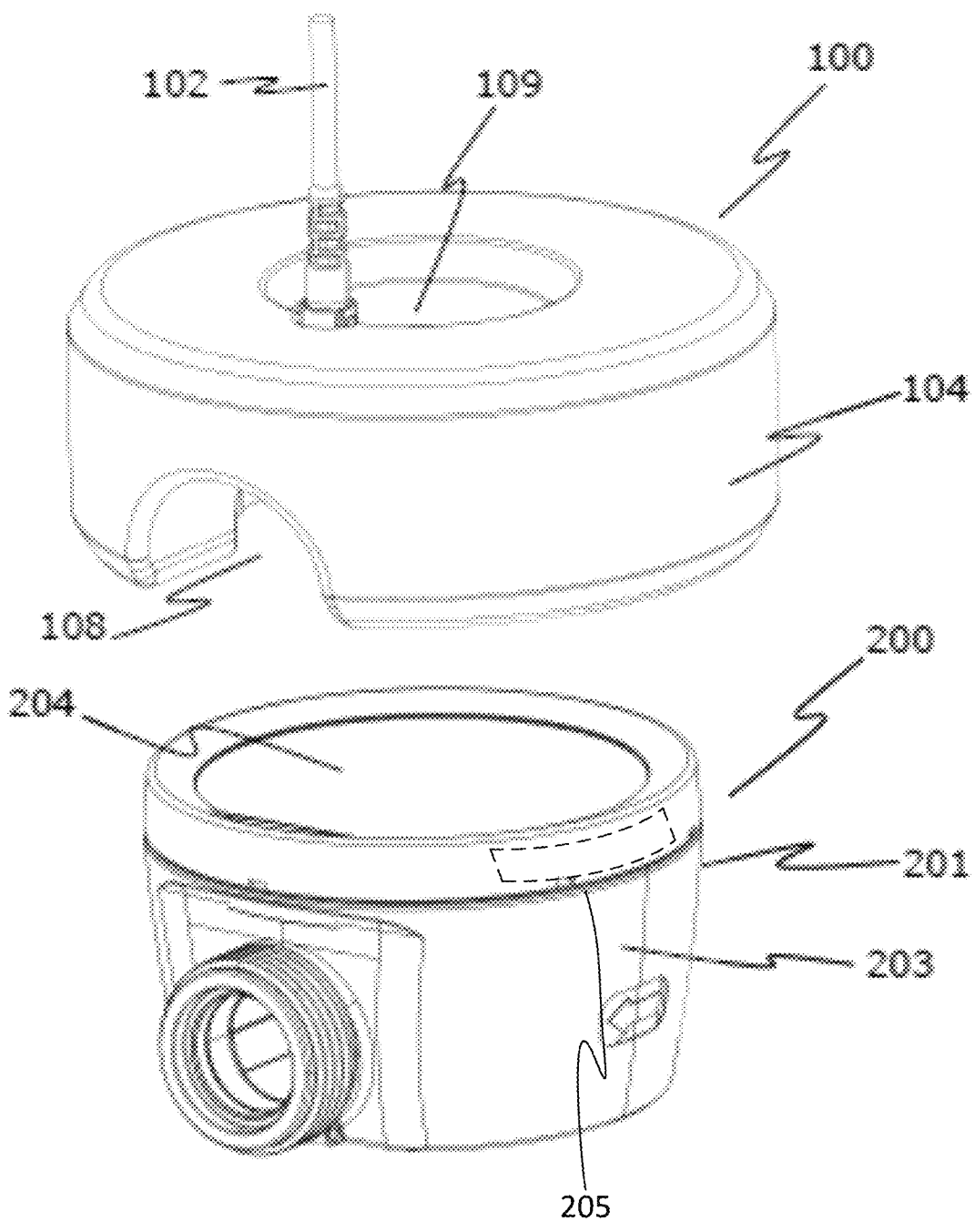
FIG. 2 shows the example of a transmission coupler separated from the water meter of FIG. 1.

In FIG. 2 the transmission coupler 100 is displayed separated from the utility meter 200. As can be seen from FIG. 2 the transmission coupler 100 is arranged to be retrofitted on the utility meter 200, e.g. in case of poor radio connection at the installation point of the utility meter 200. The transmission coupler is especially advantageous in relation to utility meters arranged in metering pits which may be flooded or where dirt is washed by water into the pit and buries the utility meter whereby radio transmission using the meter antenna 205 becomes very difficult due to the poor radio conditions caused by water and/or dirt covering the utility meter. The transmission line is connected to a remote antenna (not shown) installed outside the pit or in the pit lid. Further, the displacement element 104 displaces water or dirt away from the near field of the coupling antenna whereby the electromagnetic properties of the surroundings of the coupling antenna becomes more constant.

Since water, dirt and air have different electromagnetic properties the coupling antenna and the meter antenna 205 will be detuned if the e.g. air in the reactive near field is replaced by water or dirt. In particular, tests have revealed that the antennas are most sensitive to changes in the volume of the reactive near field, especially the part of the reactive near field most proximal to the antenna.

Figure 3:
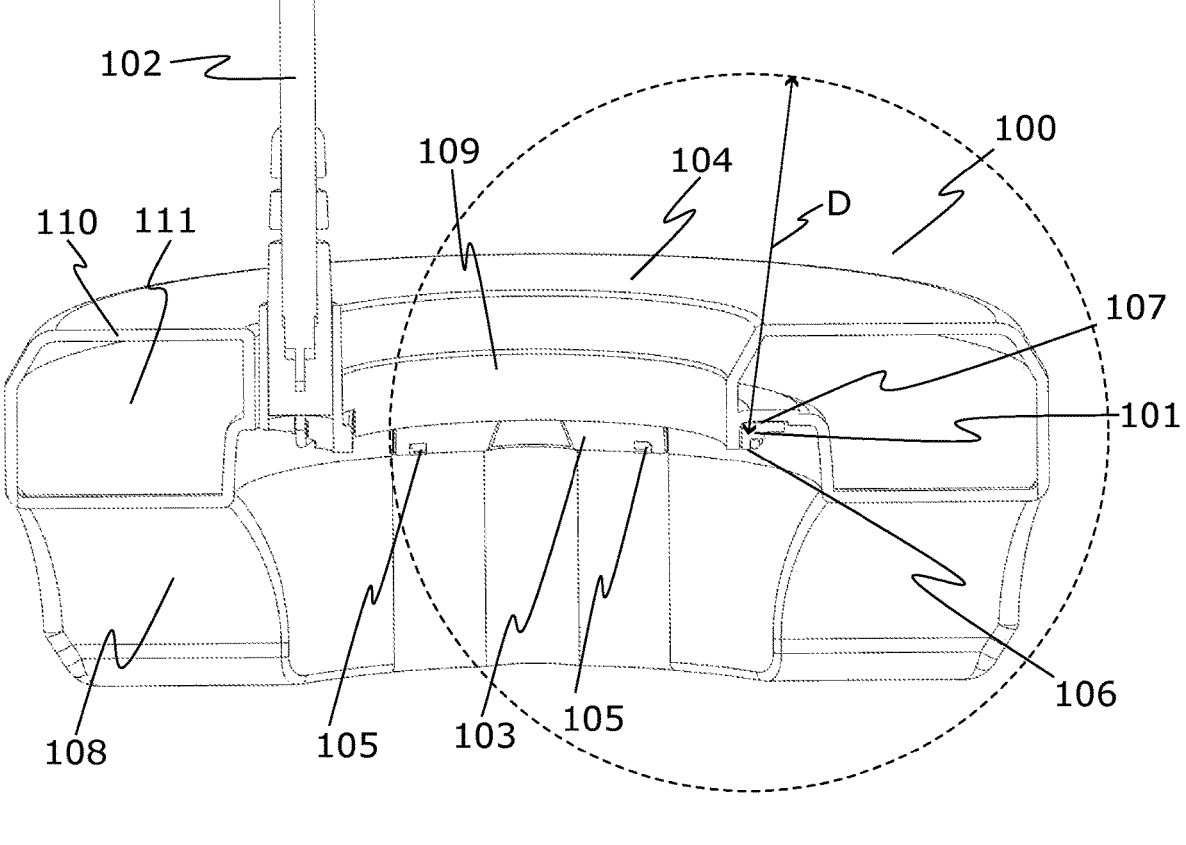
FIG. 3 shows a cross section of the example of a transmission coupler.

FIG. 3 shows a section of the transmission coupler 100. The mechanical connection element 103 has protrusions arranged for interaction with indentations on the meter housing 201 (not shown) whereby a snap-locking mechanism for mechanical connection of the transmission coupler to the meter housing is obtained. Thus, the mechanical connection element ensures that the transmission coupler is attached to the meter housing and will not float in case the utility meter is flooded. Alternatively, the transmission coupler may be mechanically connected to the meter with other connection means such as glue, screws, a threaded part or a strap.

The transmission line 102 is electrically connected to the coupling antenna 101. As an alternative to the transmission line the coupling antenna may be electrically connected to an RF connector (not shown). A remote antenna (not shown) may be connected to the transmission line or RF connector.

The coupling antenna is a loop antenna, but alternative antennas such as a mono pole, a dipole, an inverted-F or other types of antennas may be used. The coupling antenna is arranged with a first surface 106 facing the meter housing 201 and a second surface 107 facing the displacement element 104. Thereby the coupling antenna is arranged in between the meter housing and the displacement element.

The displacement element 104 has the shape of a ring or a donut like structure. The displacement element 104 has indentations 108 for allowing connection of pipes to the utility meter. The displacement element 104 has an opening 109 for allowing direct reading of a utility meter display 202 as seen in FIG. 1b. The opening 109 is not required for the function of the displacement element and is purely optional, it only serves the purpose of enabling an operator to read the display of the meter. Thus, the donut shape is also optional and in an alternative the displacement element may have the shape of a hat-like structure.

The coupling antenna 101 is arranged on top of the meter housing 201 facing the horizontal wall 204 of the meter house which is also the lid of the meter house. The lid of the meter housing 201 is also to be construed as a wall of the meter housing. The displacement element 104 is arranged to extend along a vertical wall 203 and a horizontal wall 204 of the meter housing 201. The displacement element has a surface facing the second surface 107 of the coupling antenna. The displacement element is arranged to occupy a large portion of the reactive near field of the coupling antenna. The meter housing occupies another part of the reactive near field. Thus, the unoccupied part of the reactive near field of the coupling antenna is minimized to reduce the influence of a medium surrounding the transmission coupler on the near field coupling between the coupling antenna and the meter antenna 205. The meter antenna 205 may be arranged in a peripheral part of the meter housing such as close to the vertical wall and/or close to the horizontal wall to be very close to the coupling antenna whereby the displacement element also is arranged in the reactive near field of the meter antenna 205. Consequently, the unoccupied part of the reactive near field of the meter antenna 205 is also reduced.

The displacement element comprises a poly carbonate shell 110 which has a cavity 111 filled with foamed polyurethane. Alternatively, the cavity 111 may be air filled or filled with polystyrene or epoxy all of which may be foamed. The displacement element shell 110 and filler 111 may be made from alternative non-conductive materials.

The coupling antenna 101 is arranged to have a resonance frequency at 895 MHz and the meter antenna 205 is arranged to have a resonance at 868 MHz or 915 MHz depending on the communication protocol used for transferring meter data. Thus, the resonance of the coupler antenna is a compromise to cover more alternative meter antennas. Alternatively, the meter antenna 205 is a dual band antenna with two resonance frequencies, one at 868 MHz and a second at 915 MHz. Other frequencies suited for different communication protocols may be used for the resonance frequency to adapt to specific frequencies specified for the communication protocols such as 863.1, 865.1 868.3, 869.525 for LoRa or 868.13 MHz for Sigfox or 868.95 MHz for wM-Bus or 902-928 MHz for systems for operating in the USA or any frequency used for LTE cat. NB1 or NB2 or cat. M1 or M2. Due to the many operating frequencies the resonance frequency is often selected to cover a frequency band including multiple operating frequencies. It is understood by the skilled person that the selection of the resonance frequencies of the coupler antenna and the meter antenna 205 is a compromise between optimized performance in form of a low coupling loss and a flexible design covering a band of different operating frequencies and communication protocols. Alternatively, the coupler antenna may be arranged to have a resonance at the operating frequency of the meter. Near field coupling is achieved when the coupling antenna and the meter antenna 205 are arranged in the near field of each other. To improve the efficiency of the near field coupling the antennas may be arranged in the reactive near fields. In an optional case the coupler antenna has a maximum length which is shorter than half a wavelength. In that optional case the coupler antenna it is considered an electromagnetically short antenna. The reactive near field is calculated as the zone or space within the distance D=λ/2π f from the antenna. This can be seen from the exemplary reactive near filed illustrated with a circle and the example distance D on FIG. 3, not all of the space within the reactive near field needs to be occupied by the displacement element 104, but especially the part of the reactive near field closest to the coupling antenna 101 is to the highest degree occupied by the displacement element 104. It is understood by the skilled person that the distance D depends on the operating frequency. The exemplary reactive near field on FIG. 3 may in other embodiments be larger or smaller compared to the displacement element. It is also seen that the meter housing 201 and the displacement element 104 in union occupies a large part of the reactive near filed.

Figure 4:
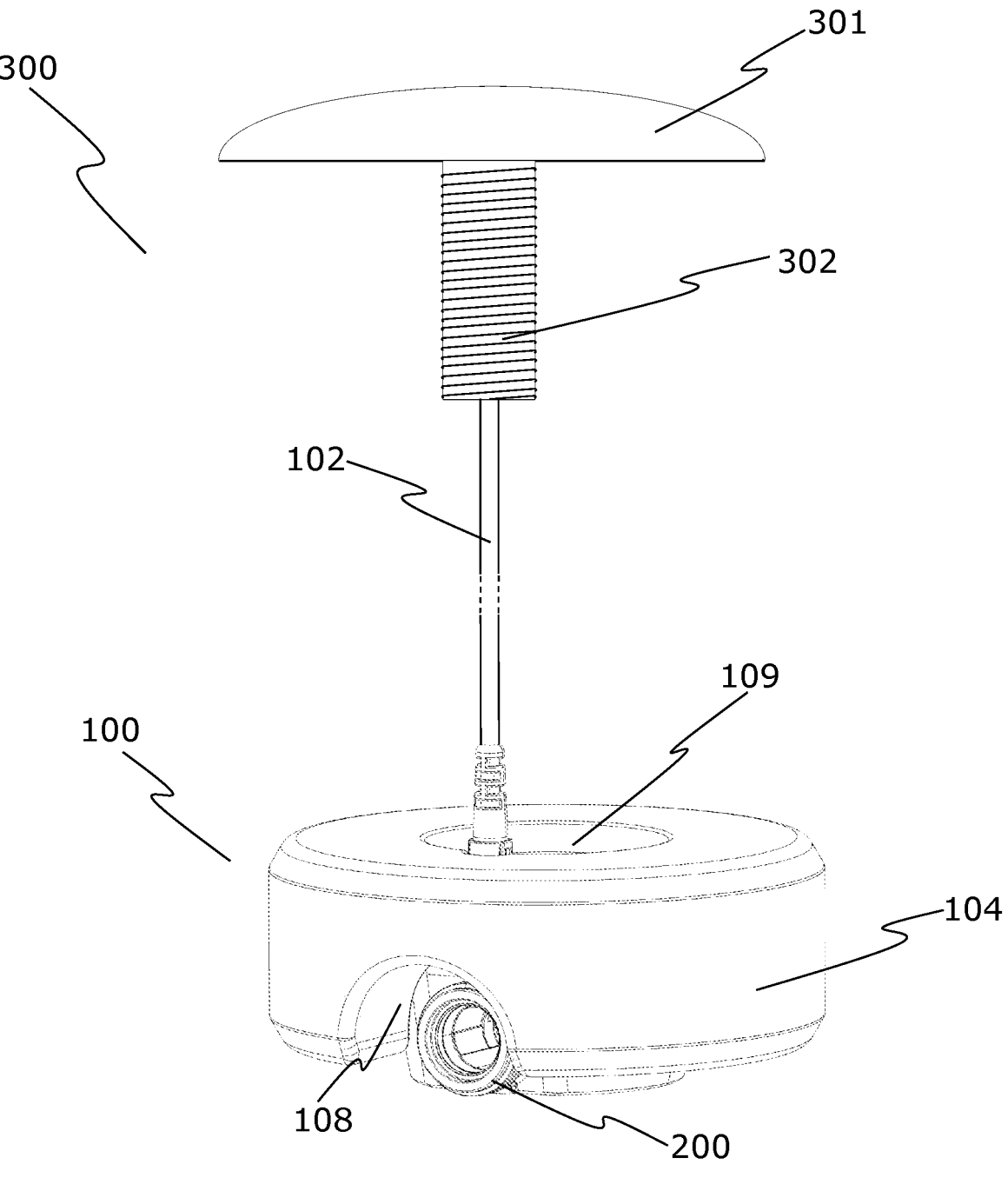
FIG. 4 shows an example of a consumption data transmission system.

FIG. 4 shows a second embodiment in form of a consumption data transmission system 300 comprising a utility meter 200, in this case a water meter, a transmission coupler 100 as described in the first embodiment above and a remote antenna 301. The transmission coupler 100 is arranged on the utility meter 200 and connected to the remote antenna 301 via a transmission line 102. The consumption data transmission system 300 is suitable for being mounted in a metering pit in that the utility meter is hermetically closed to avoid water intrusion into the meter housing 201, the meter antenna 205 and the coupler antenna are arranged for non-galvanic near field coupling. The transmission coupler 100 comprises a displacement element 104 for increasing immunity to changes in the medium surrounding the transmission coupler 100. The remote antenna is a pit lid antenna arranged for being mounted in a pit lid. The transmission line 102 connecting the transmission coupler 100 and the remote antenna 301 is a low loss coaxial cable. The connection of the coaxial cable 102 to the transmission coupler 100 and the remote antenna 301 is sealed to avoid water intrusion. As an alternative the coaxial cable may be connected to either the transmission coupler or the remote antenna via an RF connector to ease installation. The remote antenna 301 has an optional threaded part 302 which may be used for fastening the remote antenna 301 to a pit lid. The remote antenna 301 includes a suitable antenna element such as a monopole, a dipole, a patch antenna, an inverted-F antenna, an planar inverted-F antenna or any other suitable antenna. Preferably the remote antenna is also hermetically closed to protect the antenna element from intruding water. The remote antenna is in this case closed by potting using an epoxy material.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE NUMERALS

100 transmission coupler
101 coupling antenna
102 Transmission line
103 mechanical connection element
104 displacement element
105 protrusion
106 first surface
107 second surface
108 indentation
109 opening
110 shell
111 cavity
200 utility meter
201 meter housing
202 utility meter display
203 vertical wall
204 horizontal wall
300 consumption data transmission system
301 remote antenna

302 threaded part
D distance

The invention claimed is:

1. A transmission coupler for receiving radio signals carrying consumption data from a utility meter comprising a meter housing wherein a radio frequency transmitter circuit and a meter antenna are arranged therein, the transmission coupler comprising:
    a coupling antenna;
    a transmission line or a radio frequency connector for connection of a transmission line;
    a mechanical connection element arranged for mechanically connecting the transmission coupler to an outer surface of the meter housing, whereby a near field coupling is provided between the meter antenna and the coupling antenna through the meter housing, and wherein the transmission line or radio frequency connector is electrically connected to the coupling antenna; and
    a displacement element arranged to occupy a volume in the proximity of the coupling antenna, whereby a volume of a medium surrounding the transmission coupler is displaced away from the coupling antenna by the displacement element, such that the influence on the near field coupling by said medium surrounding the coupling antenna is reduced.

2. The transmission coupler according to claim 1, wherein the coupling antenna is tuned to have a resonance at a predetermined frequency and an influence on the resonance of the coupling antenna by the medium surrounding the transmission coupler is reduced by the displacement element.

3. The transmission coupler according to claim 2 wherein the coupling antenna has a maximum length or maximum dimension which is shorter than half the wavelength of a radio signal at the predetermined frequency in free space.

4. The transmission coupler according to claim 2 wherein the displacement element is arranged in the reactive near field of the coupling antenna, wherein the reactive near field is defined as being within a distance D of the coupling antenna calculated as $D=\lambda/2\pi$, and wherein $\lambda$ is the wavelength of a radio signal at the predetermined frequency in free space.

5. The transmission coupler according to claim 1 wherein the coupling antenna has a first surface arranged for facing a surface of the meter housing and a second surface arranged for facing away from the meter housing, and the displacement element is arranged to occupy a volume in the proximity of the second surface.

6. The transmission coupler according to claim 5 wherein the displacement element extends at least 5 mm in a direction at least one of: perpendicular to the second surface or parallel to the second surface.

7. The transmission coupler according to claim 1 wherein the displacement element extends along a length of the coupling antenna and occupies a volume of at least 100 mm3 per mm of extension along the length of the coupling antenna.

8. A consumption data transmission system comprising:
    a utility meter having a meter housing wherein a meter antenna and a radio frequency transmitter circuit is arranged;
    a remote antenna;
    a transmission coupler for receiving radio signals carrying consumption data from the utility meter, the transmission coupler comprising:

a mechanical connection element, a coupling antenna arranged at an outer surface of the meter housing, and a transmission line, wherein the transmission coupler is mechanically connected to the meter housing via the mechanical connection element such that the coupling antenna and the meter antenna are arranged for near field coupling between the respective two antennas through the meter housing and the transmission line is arranged to electrically connect the coupling antenna to the remote antenna; and a displacement element arranged to occupy a volume in the proximity of at least one of the coupling antenna or the meter antenna, whereby a volume of a medium surrounding the transmission coupler is displaced away from at least one of the coupling antenna or the meter antenna by the displacement element, such that the influence on the near field coupling between the meter antenna and the coupling antenna by the medium surrounding the transmission coupler is reduced.

9. A consumption data transmission system according to claim 8, wherein the meter antenna and the coupling antenna each are tuned to have a resonance at a predetermined frequency and an influence on the resonance of at least one of the coupling antenna or the meter antenna by the medium surrounding the transmission coupler is reduced by the displacement element.

10. A consumption data transmission system according to claim 9 wherein at least one of the coupling antenna or the meter antenna has a maximum length or maximum dimension which is shorter than half the wavelength of a radio signal at the predetermined frequency in free space.

11. A consumption data transmission system according to claim 9 wherein the displacement element is arranged in the reactive near field of at least one of the coupling antenna or the meter antenna and the reactive near field is defined as being within a distance D from at least one of the coupling antenna or meter antenna calculated as $D=\lambda/2\pi$, where $\lambda$ is the wavelength of a radio signal at the predetermined frequency in free space.

12. A consumption data transmission system according to claim 8 wherein the coupling antenna has a first surface arranged for facing a surface of the meter housing and a second surface arranged for facing away from the meter housing, and the displacement element is arranged to occupy a volume in the proximity of the second surface.

13. A consumption data transmission system according to claim 12 wherein the displacement element extends at least 5 mm in a direction at least one of perpendicular to the second surface or parallel to the second surface.

14. A consumption data transmission system according to claim 8 wherein the displacement element extends along a length of the coupling antenna and occupies a volume of at least 100 mm3 per mm of extension along the length of the coupling antenna.

15. A consumption data transmission system according to claim 8 wherein the coupling antenna is arranged between the meter housing and the displacement element.

* * * * *